(12) United States Patent
Aso

(10) Patent No.: US 8,320,138 B2
(45) Date of Patent: Nov. 27, 2012

(54) DC CONVERTER

(75) Inventor: Shinji Aso, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 323 days.

(21) Appl. No.: 12/682,623

(22) PCT Filed: Sep. 18, 2008

(86) PCT No.: PCT/JP2008/066838
§ 371 (c)(1),
(2), (4) Date: Apr. 12, 2010

(87) PCT Pub. No.: WO2009/050975
PCT Pub. Date: Apr. 23, 2009

(65) Prior Publication Data
US 2010/0232184 A1   Sep. 16, 2010

(30) Foreign Application Priority Data

Oct. 19, 2007 (JP) ................. 2007-272557

(51) Int. Cl.
*H02M 3/335* (2006.01)
(52) U.S. Cl. .......................................... 363/16; 363/131
(58) Field of Classification Search ............ 363/16.131, 363/140
See application file for complete search history.

(56) References Cited

U.S. PATENT DOCUMENTS

| 4,679,129 | A * | 7/1987 | Sakakibara et al. ............ 363/17 |
| 5,132,889 | A | 7/1992 | Hitchcock et al. |
| 7,583,520 | B2 | 9/2009 | Aso |
| 7,589,980 | B2 | 9/2009 | Aso |
| 2002/0012257 | A1 | 1/2002 | Takahama et al. |
| 2009/0201700 | A1 | 8/2009 | Aso et al. |

FOREIGN PATENT DOCUMENTS

| JP | 5 111256 | 4/1993 |
| JP | 7 123718 | 5/1995 |
| JP | 2001 359279 | 12/2001 |
| JP | 2003 319650 | 11/2003 |

OTHER PUBLICATIONS

Office Action issued Sep. 23, 2011 in Korea Application No. 10-2010-7007438 (With Partial English Translation).

(Continued)

*Primary Examiner* — Shawn Riley
(74) *Attorney, Agent, or Firm* — Oblon, Spivak, McClelland, Maier & Neustadt, L.L.P.

(57) ABSTRACT

A DC converter includes: a transformer (T1) including a primary winding (P1) and a secondary winding (S1); a series resonant circuit in which a current resonant reactor (Lr), the primary winding (P1) of the transformer, and a current resonant capacitor (Cri) are connected in series; conversion circuits (Q1, Q2) for converting a DC voltage of a DC power supply (Vin) into a rectangular-wave voltage, so as to output the rectangular-wave voltage to the series resonant circuit; and a rectifier smoothing circuit (D3, D4, Co) for rectifying and smoothing a voltage generated at the secondary winding (S1) of the transformer, so as to output a DC output voltage to a load, wherein a capacitive element (Cr) including a capacitive component corresponding to a floating capacitance (Cp) equivalently present between the primary winding of the transformer was connected to the current resonant reactor (Lr) in parallel.

9 Claims, 16 Drawing Sheets

OTHER PUBLICATIONS

Muhammad H. Rashid, "Power Electronics Handbook", Academic Press 2001, pp. 284-289.

Satoshi Nagai, et al., "High-Frequency Inverter with Phase-Shifted PWM and Load-Adaptive PFM Control Strategy for Industrial Induction-Heating", Industry Applications Society Annual Meeting, Conference Record of the 1993 IEEE, 1993, pp. 2165-2172.

* cited by examiner

DC CONVERTER

TECHNICAL FIELD

The present invention relates to a DC converter that is highly efficient, small in size and inexpensive.

BACKGROUND ART

FIG. 1 illustrates a circuit configuration diagram of a conventional DC converter (PLT 1). This DC converter is composed of a half-bridge circuit, in which a series circuit including switching elements Q1 and Q2 consisting of MOSFETs is connected to both ends of a DC power supply Vin. A drain of the switching element Q2 is connected to a positive electrode of the DC power supply Vin and a source of the switching element Q1 is connected to a negative electrode of the DC power supply Vin.

Between the drain and source of the switching element Q1, a diode D1 and a voltage resonant capacitor Cry are connected in parallel. In addition, a reactor Lr1, a primary winding P1 of a transformer T1, and a current resonant capacitor Cri are connected in series. The reactor Lr1 is a leakage inductance between the primary and secondary sides of the transformer T1. The primary winding P1 is connected to a magnetizing inductance as an equivalent reactor Lp. Between a drain and a source of the switching element Q2, a diode D2 is connected in parallel.

A winding start of each winding of the transformer T1 is depicted as a dot. One end (dot side) of a secondary winding S1 of the transformer T1 is connected to an anode of a diode D3. The other end of the secondary winding S1 of the transformer T1 and one end (dot side) of a secondary winding S2 of the transformer T1 are connected to one end of a smoothing capacitor Co. The other end of the secondary winding S2 of the transformer T1 is connected to an anode of a diode D4. A cathode of the diode D3 and a cathode of the diode D4 are connected to another end of the capacitor Co. The both ends of the capacitor Co are connected to a load Ro.

A PFM controller 10 alternately turns on/off the switching elements Q1 and Q2 according to an output voltage Vo from the capacitor Co, thereby fixing an on-duty of the switching elements Q1 and Q2 so as to vary a frequency of the switching elements Q1 and Q2. Thus, PFM control (frequency control) is carried out so that the output voltage Vo from the capacitor Co is kept constant.

Next, operations of the conventional DC converter with the above-mentioned configuration will be explained with reference to a timing chart of signals of each part at rated load illustrated in FIG. 2.

In FIG. 2, VQ1 is a drain-source voltage of the switching element Q1, IQ1 is a drain current of the switching element Q1, VQ2 is a drain-source voltage of the switching element Q2, IQ2 is a drain current of the switching element Q2, VCri is a voltage between both ends of the current resonant capacitor Cri, VD3 is a voltage between both ends of the diode D3, ID3 is a current of the diode D3, VD4 is a voltage between both ends of the diode D4, and ID4 is a current of the diode D4.

Note that, there is a dead time during which the switching elements Q1 and Q2 are both off, and the switching elements Q1 and Q2 are alternately turned on and off.

In an interval between time t0 and time t1, the switching element Q2 is switched from on to off at time t0. In a state where the switching element Q2 is an on state, the primary side of the transformer T1 passes a current in a route along Vin->Q2->Lr1->Lp->Cri->Vin. Similarly, the secondary side of the transformer T1 passes a current in a route along Co->Ro->Co.

When the switching element Q2 is turned off, the current flowing the primary side of the transformer T1 is shifted from the switching element Q2 to the voltage resonant capacitor Crv, and passes in a route along Crv->Lr1->Lp->Cri->Crv.

As a result, the voltage resonant capacitor Crv, which substantially has the voltage of the DC power supply Vin in the state where the switching element Q2 is an on state, discharges to 0 V by turning off the switching element Q2 (hereinafter, the voltage of the DC power supply Vin is also represented by Vin).

Since the voltage of the voltage resonant capacitor Cry is equal to the voltage VQ1 of the switching element Q1, the voltage VQ1 of the switching element Q1 decreases from Vin to 0 V. In addition, the voltage VQ2 of the switching element Q2 is equal to (Vin−VQ1), and therefore, increases from 0 V to Vin.

In an interval from time t1 to time t2, the voltage of the voltage resonant capacitor Cry decreases to 0 V at time t1. Then, the diode D1 becomes conductive to pass a current in a route along D1->Lr1->Lp (P1)->Cri->D1. When the voltage of the secondary winding S2 of the transformer T1 reaches the output voltage Vo, the secondary side of the transformer T1 passes currents in a route along Co->Ro->Co and in a route along S2->D4->Co->S2. Also in the interval from time t1 to time t2, a gate signal to the switching element Q1 turns on, so that the switching element Q1 conducts a zero-voltage switching (ZVS) operation and a zero-current switching (ZCS) operation.

In an interval from time t2 to time t3, the switching element Q1 is an on state at time t2, so as to pass a current in a route along Cri->Lp (P1)->Lr1->Q1->Cri. Thus, the voltage VCri of the current resonant capacitor Cri decreases. In addition, the secondary side of the transformer T1 passes currents in a route along S2->D4->Co->S2 and in a route along Co->Ro->Co. The voltage of the secondary winding S2 is clamped at the output voltage Vo, and the voltage of the primary winding P1 is clamped at a voltage that the output voltage Vo is multiplied by a turn ratio of the transformer T1. Therefore, the primary side of the transformer T1 passes a resonant current produced by the reactor Lr1 and the current resonant capacitor Cri.

In an interval from time t3 to time t4, the voltage of the secondary winding S2 becomes lower than the output voltage Vo at time t3, and the current on the secondary side of the transformer T1 becomes zero. Thus, the secondary side of the transformer T1 passes a current in a route along Co->Ro->Co. Also, the primary side of the transformer T1 passes a current in a route along Cri->Lp->Lr1->Q1->Cri. In other words, the primary side of the transformer T1 passes a resonant current produced by the sum of the two reactors Lr1 and Lp (Lr1+Lp) and the current resonant capacitor Cri.

In an interval from time t4 to time t5, the switching element Q1 turns off at time t4. Then, the current flowing the primary side of the transformer T1 is shifted from the switching element Q1 to the voltage resonant capacitor Crv, thereby passing in a route along Lp->Lr1->Crv->Cri->Lp.

As a result, the voltage resonant capacitor Crv, which substantially has 0 V in the state where the switching element Q1 is an on state, is charged to Vin by turning off the switching element Q1. Since the voltage of the voltage resonant capacitor Cry is equal to the voltage VQ1 of the switching element Q1, the voltage VQ1 also increases from 0 V to Vin. In addition, the voltage VQ2 of the switching element Q2 is equal to (Vin−VQ1), and therefore, decreases from Vin to 0 V.

In an interval from time t5 to time t6, the voltage of the voltage resonant capacitor Cry increases to Vin at time t5. Then, the diode D2 becomes conductive to pass a current in a route along Lp (P1)->Lr1->D2->Vin->Cri->Lp (P1). Since the voltage of the secondary winding S1 of the transformer T1 reaches the output voltage Vo, the secondary side of the transformer T1 passes currents in a route along Co->Ro->Co and in a route along S1->D3->Co->S1. Also in the interval from time t5 to time t6, a gate signal of the switching element Q2 is turned on, so that the switching element Q2 conducts a zero-voltage switching operation and a zero-current switching operation.

In an interval from time t6 to time t7, the switching element Q2 is an on state at time t6 to pass a current in a route along Vin->Q2->Lr1->Lp (P1)->Cri->Vin. Thus, the voltage VCri of the current resonant capacitor Cri increases. In addition, the secondary side of the transformer T1 passes currents in a route along S1->D3->Co->S1 and in a route along Co->Ro->Co. The voltage of the secondary winding S1 is clamped at the output voltage Vo, and the voltage of the primary winding P1 is clamped at a voltage that the output voltage Vo is multiplied by a turn ratio of the transformer T1. Therefore, the primary side of the transformer T1 passes a resonant current produced by the reactor Lr1 and current resonant capacitor Cri.

In an interval from time t7 to time t8, the voltage of the secondary winding S1 becomes lower than the output voltage Vo at time t7. Thus, the secondary side of the transformer T1 passes a current in a route along Co->Ro->Co. Also, the primary side of the transformer T1 passes a current in a route along Vin->Q2->Lr1->Lp->Cri->Vin. In other words, the primary side of the transformer T1 passes a resonant current produced by the sum of the two reactors Lr1 and Lp (Lr1+Lp) and the current resonant capacitor Cri.

In this way, the conventional DC converter illustrated in FIG. 1 employs pulse signals having an on-duty configured to be approximately 50% so as to control the switching frequency of the switching elements Q1 and Q2. Therefore, the resonant current produced by the reactor Lr1, the reactor Lp, and the current resonant capacitor Cri is varied, thereby controlling the output voltage Vo. Namely, increasing the switching frequency results in decreasing the output voltage Vo.

FIG. 3 is a timing chart of signals of each part at no load. In FIG. 3, the load Ro is infinite. Currents ID3 and ID4 flowing in diodes D3 and D4, respectively, are the currents only to detect the output voltage Vo.

The frequency of the switching element at no load is calculated according to the following formula,

[Math 1]

$$f = \frac{1}{4 \cdot \{(Lp+Lr1) \cdot Cri\}^{1/2} \cdot \cos^{-1}\left[\left\{\frac{2 \cdot (Vo+Vf) \cdot Vin \cdot Lp \cdot Ns/}{(Lp+Lr1) \cdot Np}\right\}\right]} \quad (1)$$

In the formula, Vf is a forward voltage of the diodes D3 and D4, Np is a number of turns of the primary winding P1 of the transformer T1, and Ns is a number of turns of the secondary winding S1 of the transformer T1.

However, the actual frequency in the actual circuit becomes higher than a frequency of a theoretical value calculated by the formula (I) due to an influence of parasitic capacitances of the diodes on the secondary winding side of the transformer T1, and a parasitic capacitance between the primary winding and parasitic capacitances between the secondary windings of the transformer.

FIG. 4 is a circuit configuration diagram of the conventional DC converter in view of the parasitic capacitances. In FIG. 4, Cd1 is a parasitic capacitance of the diode D3, Cd2 is a parasitic capacitance of the diode D4, Cp 1 is a parasitic capacitance between the primary winding P1 of the transformer T1, CS1 is a parasitic capacitance between the secondary winding S1, and CS2 is a parasitic capacitance between the secondary winding S2, respectively. FIG. 5 is a timing chart of signals of each part at no load in the conventional DC converter in view of the parasitic capacitances illustrated in FIG. 4. FIG. 6 is a detail of certain intervals of the timing chart in FIG. 5.

FIG. 7 is an equivalent circuit diagram, in which the parasitic capacitances Cp1, Cd1, Cd2, CS1, and CS2 are concentrated between the primary winding P1 of the transformer T1 and illustrated as one floating capacitance Cp in the conventional DC converter in view of the parasitic capacitances illustrated in FIG. 4.

In the current resonant circuit illustrated in FIG. 1 as described above, the frequency at no load or at light load increases over the frequency of the theoretical value. Therefore, there are advantages of preventing the frequency from increasing more than the theoretical value by changing into an intermittent mode at light load, and reducing power consumption due to intermittent oscillation.

CITATION LIST

Patent Literature

[PTL 1] Japanese Patent Application Laid-Open Publication No. 2003-319650

SUMMARY OF INVENTION

Meanwhile, when the DC converter is configured to have a multi-output configuration, a cross regulation becomes worse under a combined load condition of no load (light load) in one side and heavy load in the other side.

Fundamentally, in the current resonant circuit, the secondary windings of the transformer T1 are tightly coupled. Therefore, the cross regulation should be in good condition theoretically even under the combined load condition of no load and heavy load.

In addition, in order to maintain the cross regulation in good condition, it is necessary to prevent the frequency even at no load from increasing and design the circuit under the resonant condition so as not to cause intermittent oscillation. However, since the frequency increases over the theoretical value, the frequency at rated load cannot be set at such a high level under present circumstances.

It is an object of the present invention to provide a small, inexpensive, and high-efficiency DC converter capable of preventing a frequency at no load from increasing.

A DC converter according to a first aspect of the present invention includes: a transformer comprising a primary winding and a secondary winding; a series resonant circuit in which a current resonant reactor, the primary winding of the transformer, and a current resonant capacitor are connected in series; a conversion circuit for converting a DC voltage of a DC power supply into a rectangular-wave voltage, so as to output the rectangular-wave voltage to the series resonant circuit; a rectifier smoothing circuit for rectifying and smoothing a voltage generated at the secondary winding of the transformer, so as to output a DC output voltage to a load;

and a capacitive element including a capacitive component corresponding to a floating capacitance equivalently present between the primary winding of the transformer and connected to the current resonant reactor in parallel.

The conversion circuit can include: a first switching element of which one end is connected to a negative electrode of the DC power supply; and a second switching element of which one end is connected to the other end of the first switching element and of which the other end is connected to a positive electrode of the DC power supply. In this case, the DC voltage of the DC power supply is converted into a rectangular-wave voltage by alternatively turning on/off the first switching element and the second switching element. In addition, the rectangular-wave voltage is outputted to the series resonant circuit connected between both ends of the first switching element or both ends of the second switching element.

Alternatively, the conversion circuit can include: a first switching element of which one end is connected to a negative electrode of the DC power supply; a second switching element of which one end is connected to the other end of the first switching element and of which the other end is connected to a positive electrode of the DC power supply, a third switching element of which one end is connected to a negative electrode of the DC power supply; and a fourth switching element of which one end is connected to the other end of the third switching element and of which the other end is connected to a positive electrode of the DC power supply. In this case, the DC voltage of the DC power supply is converted into an AC rectangular-wave voltage by alternatively turning on/off the first switching element and the fourth switching element, and the second switching element and the third switching element. In addition, the AC rectangular-wave voltage is outputted to the series resonant circuit connected between a node of the first switching element and the second switching element and a node of the third switching element and the fourth switching element.

The DC converter according to the first aspect of the present invention can include: a controller that controls the DC output voltage by fixing an on-time of one of the switching elements alternatively turned on/off and varying an on-time of the other switching element alternatively turned on/off.

Moreover, the DC converter according to the first aspect of the present invention can include: a controller that controls the DC output voltage by fixing an on-time of the first switching element and the fourth switching element and varying an on-time of the second switching element and the third switching element, or by fixing the on-time of the second switching element and the third switching element and varying the on-time of the first switching element and the fourth switching element.

The DC converter according to the first aspect of the present invention can include a controller that controls the DC output voltage by fixing an on-duty of each of the switching elements and varying a frequency of each of the switching elements instead of the above-mentioned controller.

Alternatively, the DC converter according to the first aspect of the present invention can include a controller that controls the DC output voltage by fixing a frequency of each of the switching elements and varying an on-duty of each of the switching elements.

Furthermore, a value of the capacitive element is determined based on a value of a magnetizing inductance of the primary winding of the transformer, a value of the floating capacitance present between the primary winding of the transformer, and a value of the current resonant reactor.

According to the first aspect of the present invention, since the capacitive element is connected to the current resonant reactor in parallel, the current passes through the capacitive element, and the floating capacitance equivalently present between the primary winding of the transformer is charged and discharged without passing a current through the current resonant reactor. Thus, it is possible to provide a small, inexpensive, and high-efficiency DC converter capable of preventing a frequency at no load from increasing.

DESCRIPTION OF EMBODIMENTS

Hereinafter, embodiments of DC converters of the present invention will be described in detail with reference to the drawings.

Figure 7:
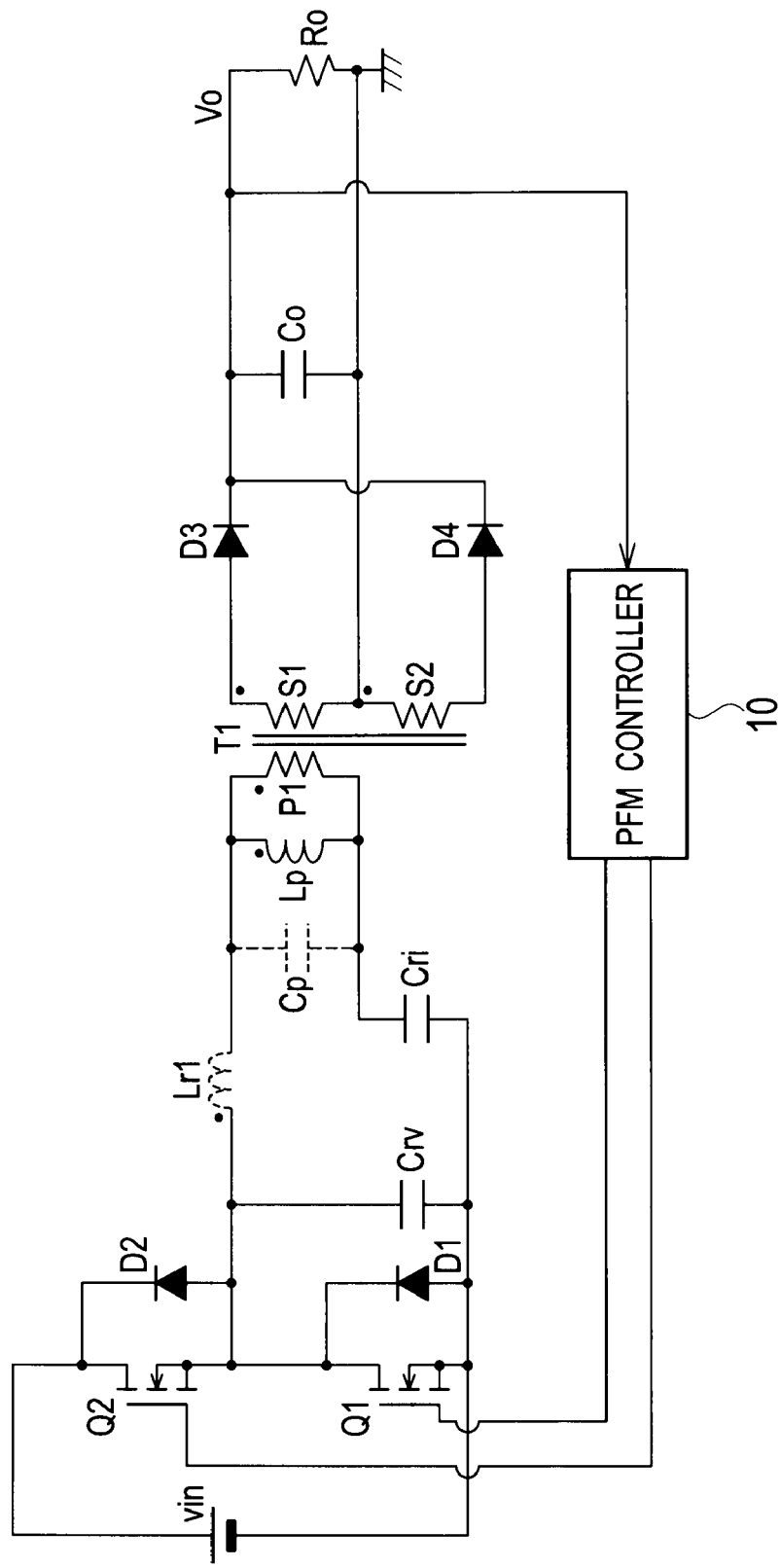
FIG. 7 is an equivalent circuit diagram illustrating each parasitic capacitance to be concentrated between a primary winding of a transformer as one floating capacitance in a conventional DC converter in view of parasitic capacitances.

First, in the conventional circuit illustrated in FIG. 7, there is a problem of increasing frequency at no load caused by a floating capacitance Cp present between a primary winding P1 of a transformer T1. This floating capacitance is mostly parasitic capacitances of diodes D3 and D4 on a secondary side of the transformer T1. When dV/dt of switching elements Q1 and Q2 composed of a half bridge on a primary side of the transformer T1 is changed, energy for charging and discharging the parasitic capacitances of the diodes D3 and D4 on the secondary side of the transformer T1 is stored in a current resonant reactor Lr1. Then, the above-mentioned problem occurs since this energy is transmitted to the secondary side of the transformer T1.

Example 1

Figure 8:
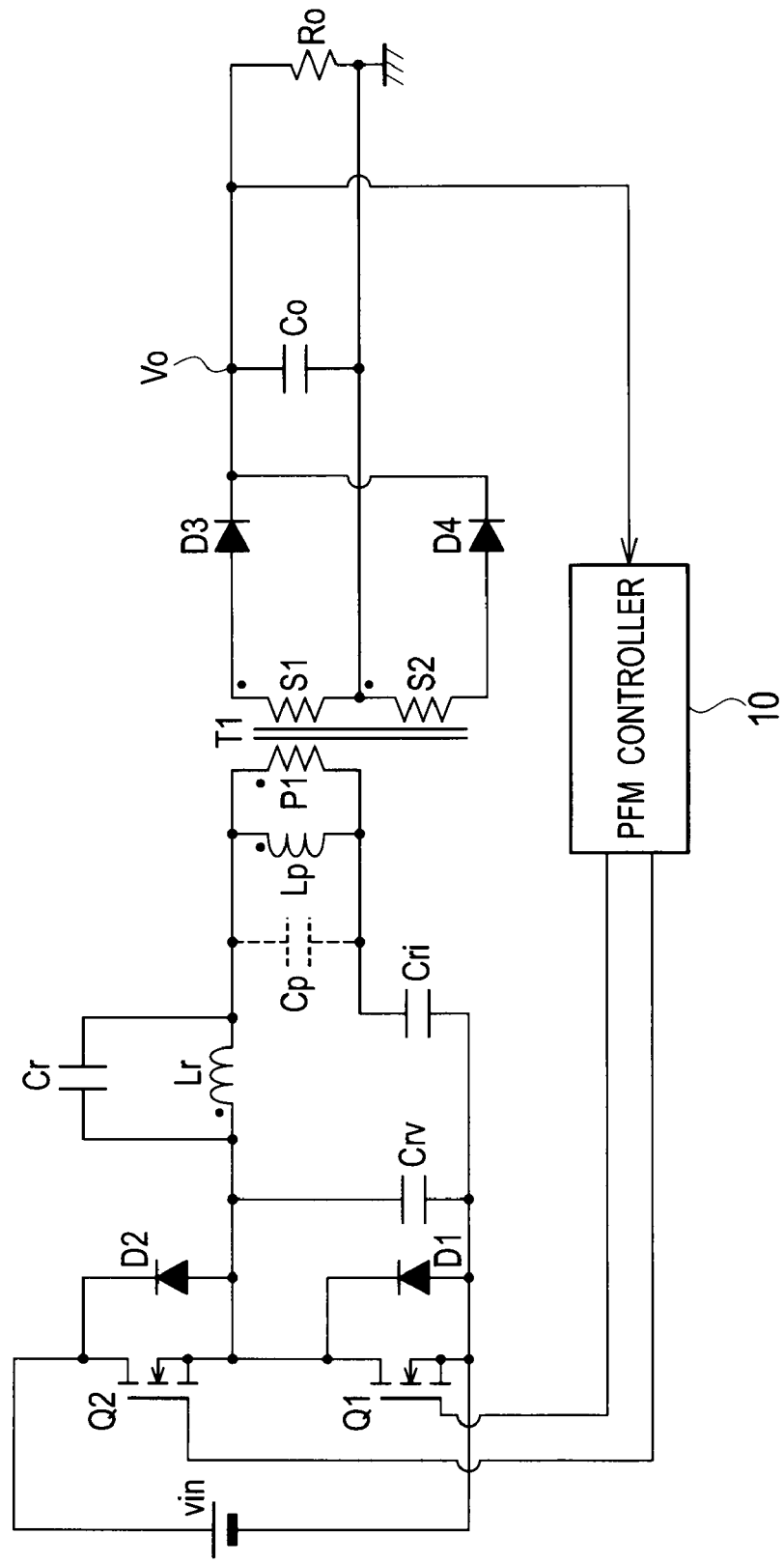
FIG. 8 is a circuit configuration diagram of a DC converter in Example 1 of the present invention.

In Example 1 illustrated in FIG. 8, in order to bypass a charge amount corresponding to charge and discharge of the floating capacitance Cp equivalently present between the primary winding P1 of the transformer T1, a capacitor Cr (capacitive element) connected to a current resonant reactor Lr in parallel is provided. Thus, charge and discharge energy of the parasitic capacitances of the diodes D3 and D4 has been configured not to be stored in the current resonant reactor Lr. That means the capacitor Cr is connected to the current resonant reactor Lr in parallel, whereby a current due to charge and discharge of the floating capacitance Cp between the primary winding P1 of the transformer T1 has been configured not to pass through the current resonant reactor Lr.

In Example 1 illustrated in FIG. 8, a series resonant circuit composed of the current resonant reactor Lr, the primary winding P1 of the transformer T1, and the current resonant capacitor Cri is connected to the switching element Q1 in parallel. Meanwhile, the series resonant circuit may be connected to the switching element Q2 in parallel, for example.

The current resonant reactor Lr is an external component, and is not a leakage inductance between the primary winding P1 and the secondary winding S1 of the transformer T1.

Figure 1:
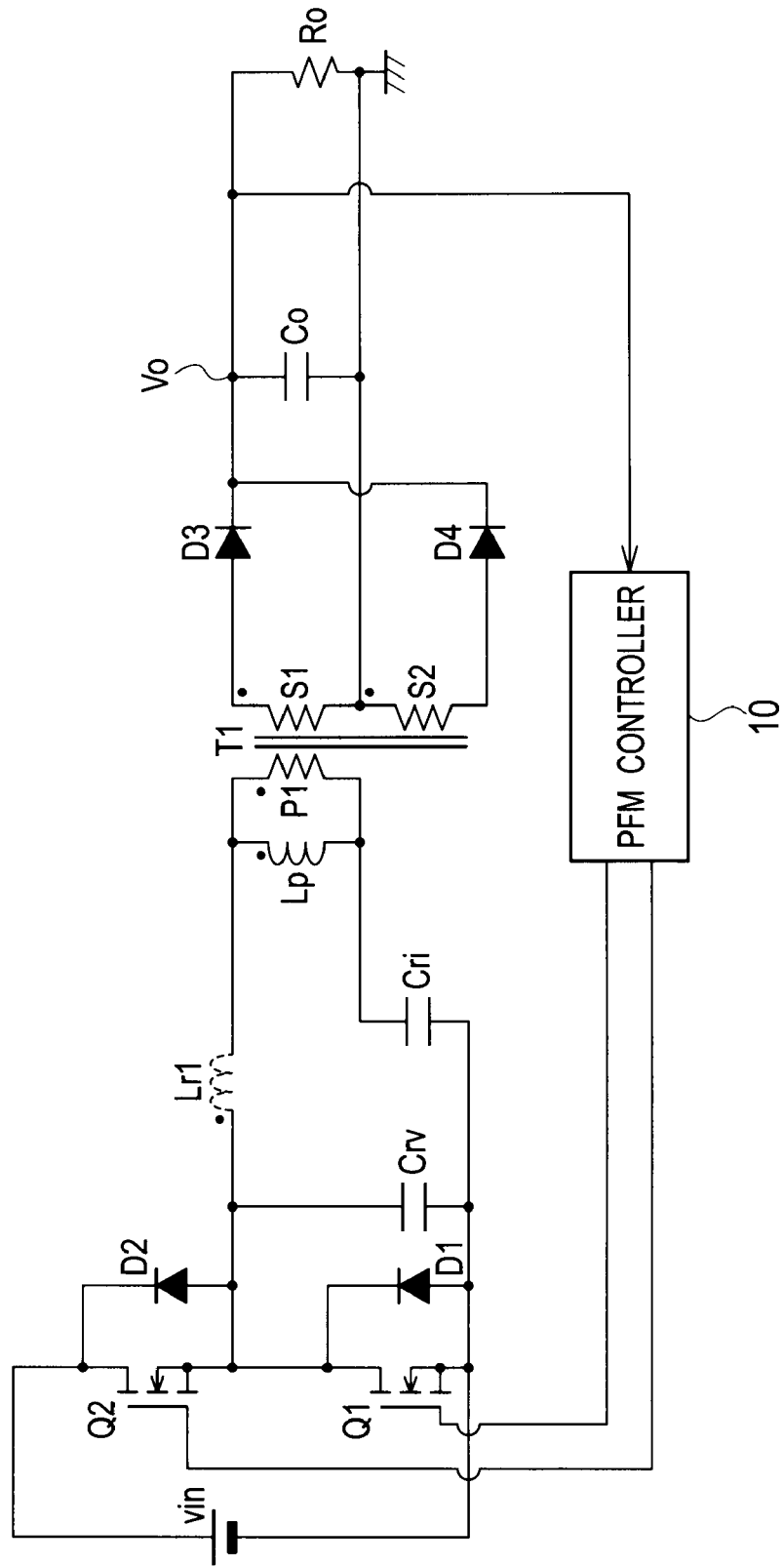
FIG. 1 is a circuit configuration diagram of a conventional DC converter.
Figure 2:
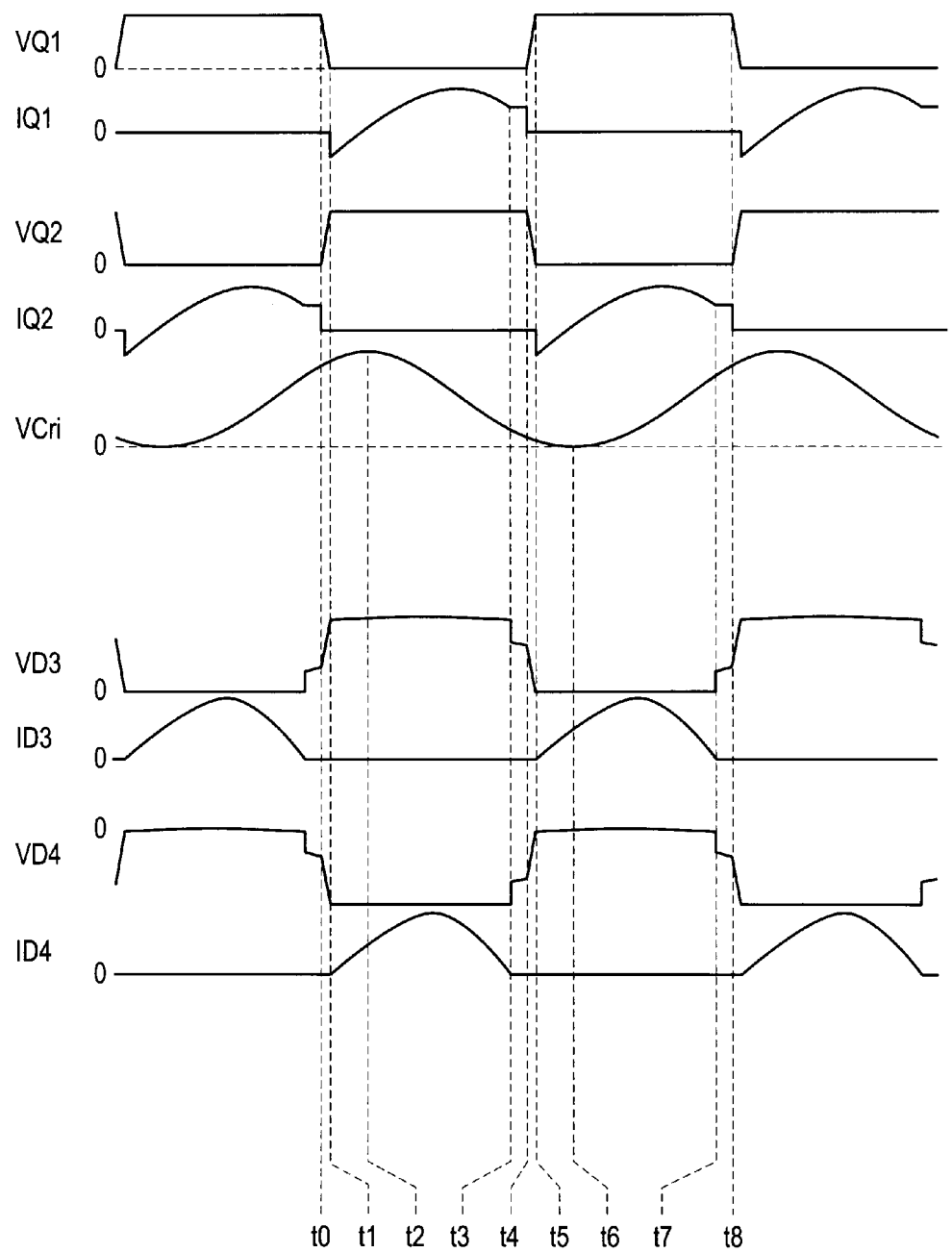
FIG. 2 is a timing chart of signals of each part at rated load in the conventional DC converter illustrated in FIG. 1.

Another configuration illustrated in FIG. 8 is the same as the circuit configuration illustrated in FIG. 1. Therefore, the same components are indicated by the same reference signs as FIG. 1, and explanations thereof are omitted. Note that, the diodes D1 and D2 may be parasitic capacitances of the switching elements Q1 and Q2.

Figure 3:
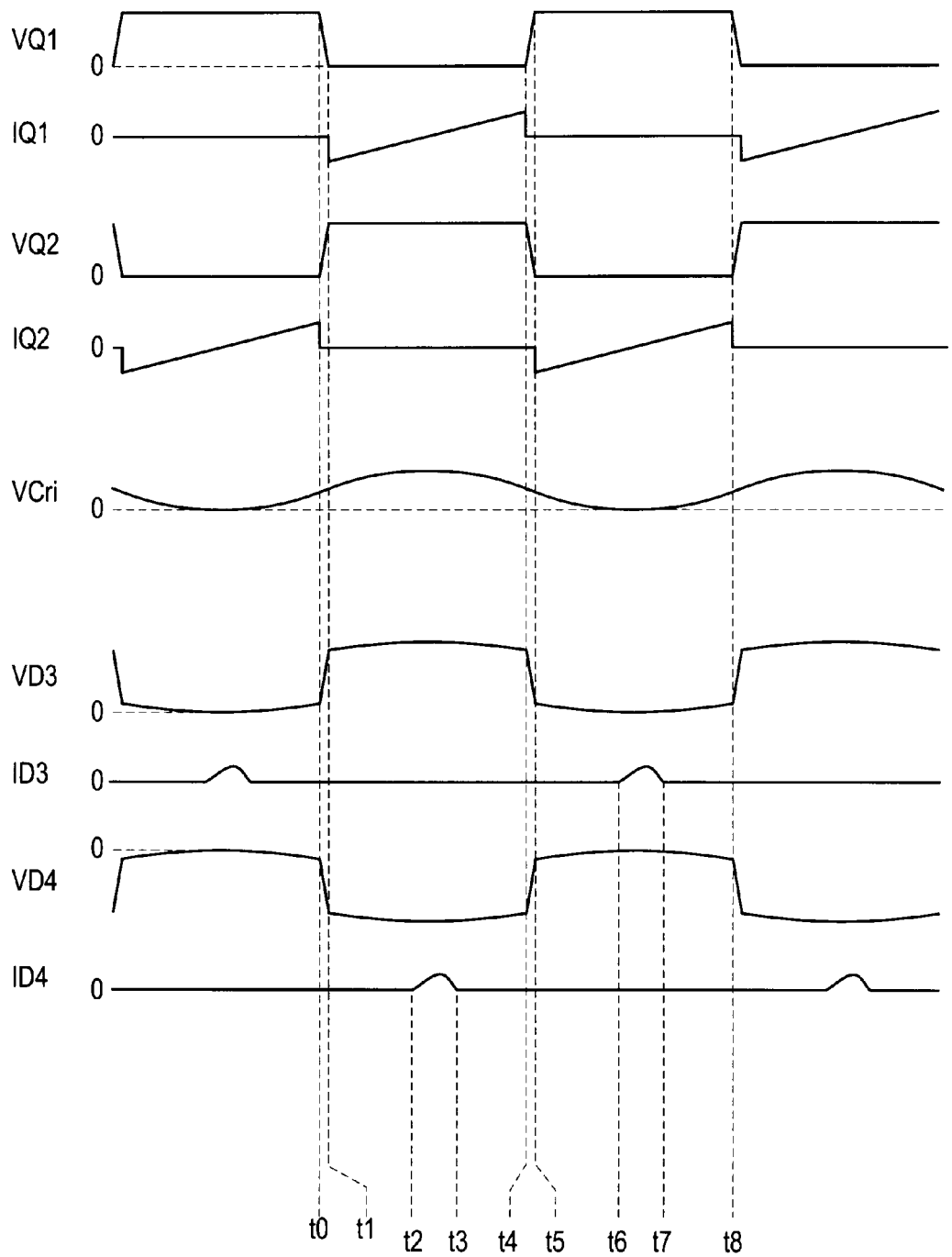
FIG. 3 is a timing chart of signals of each part at no load in the conventional DC converter illustrated in FIG. 1.
Figure 4:
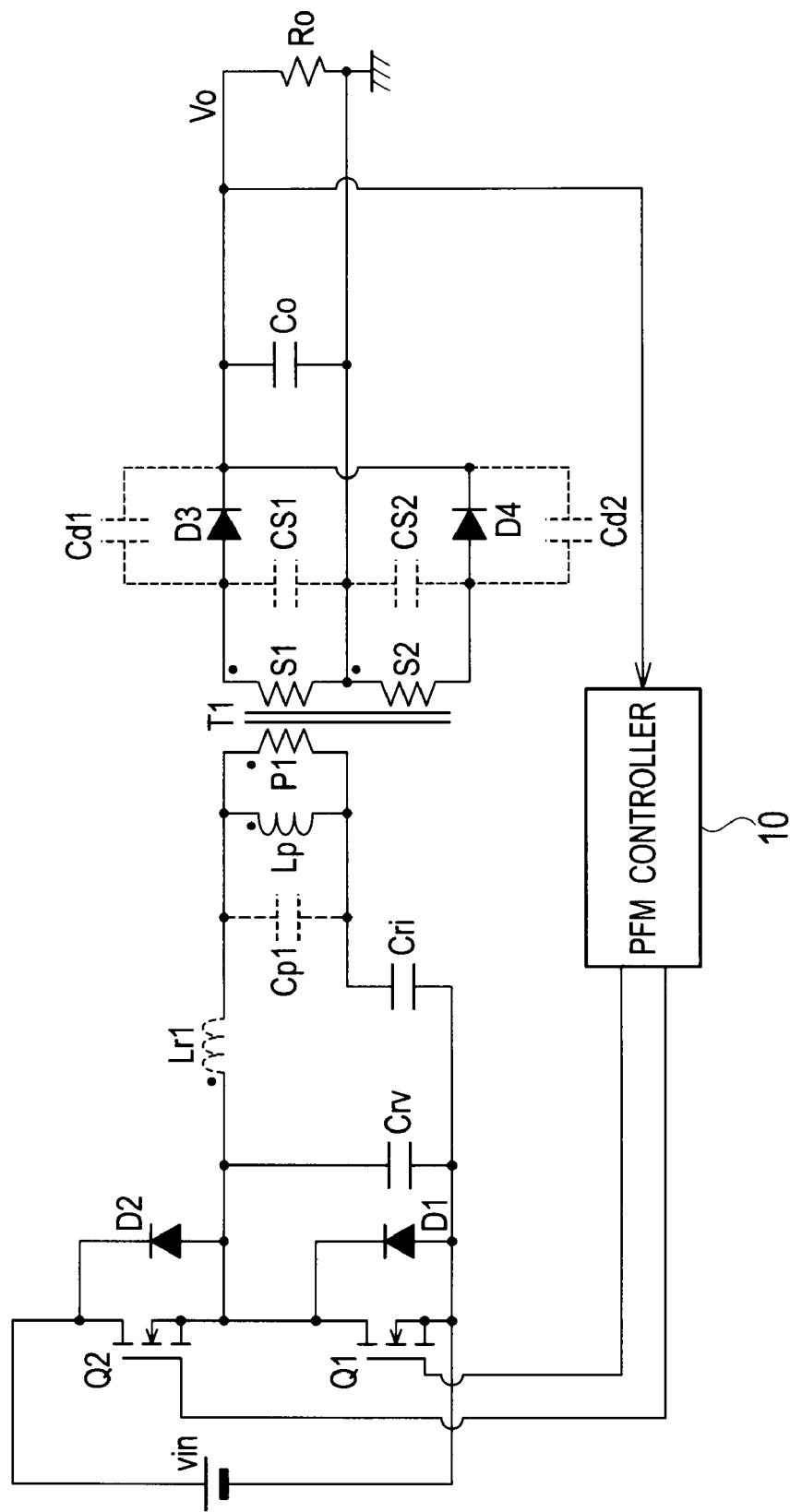
FIG. 4 is a circuit configuration diagram of a conventional DC converter in view of parasitic capacitances.
Figure 5:
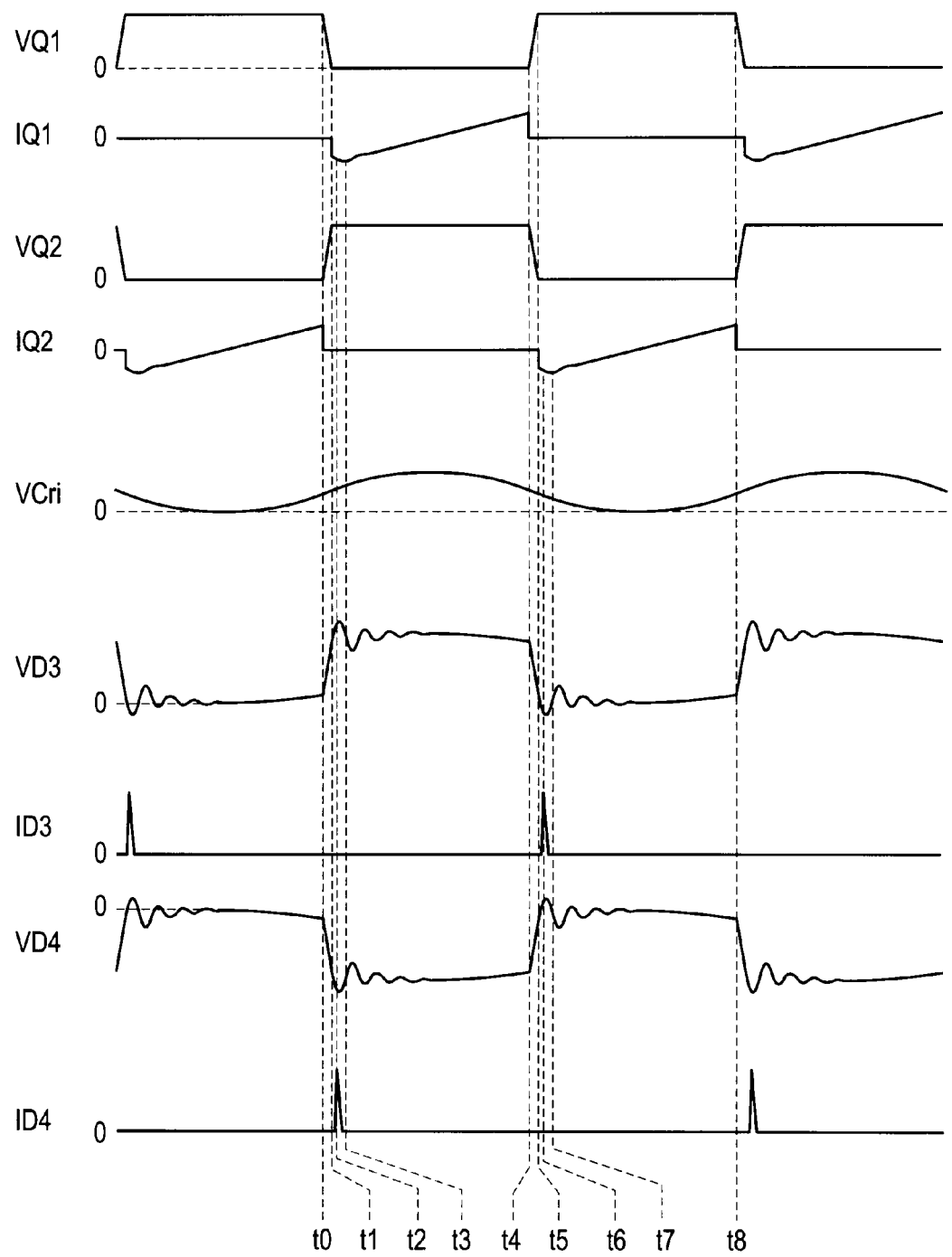
FIG. 5 is a timing chart of signals of each part at no load in the conventional DC converter in view of the parasitic capacitances illustrated in FIG. 4.
Figure 6:
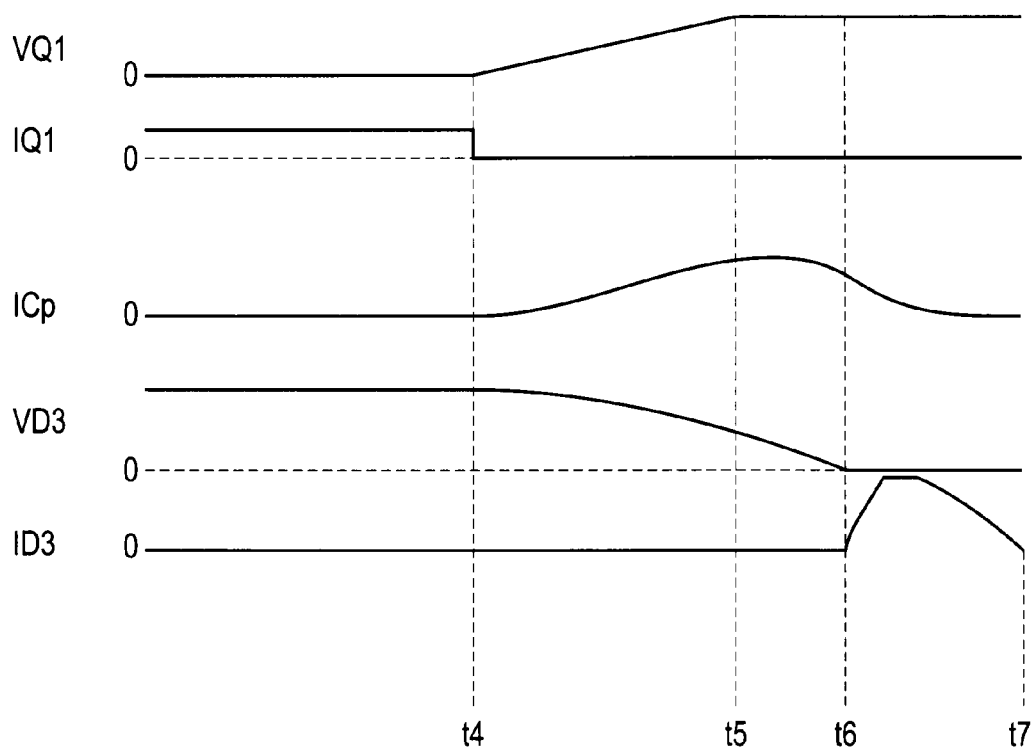
FIG. 6 is a detail of certain intervals of the timing chart illustrated in FIG. 5.
Figure 9:
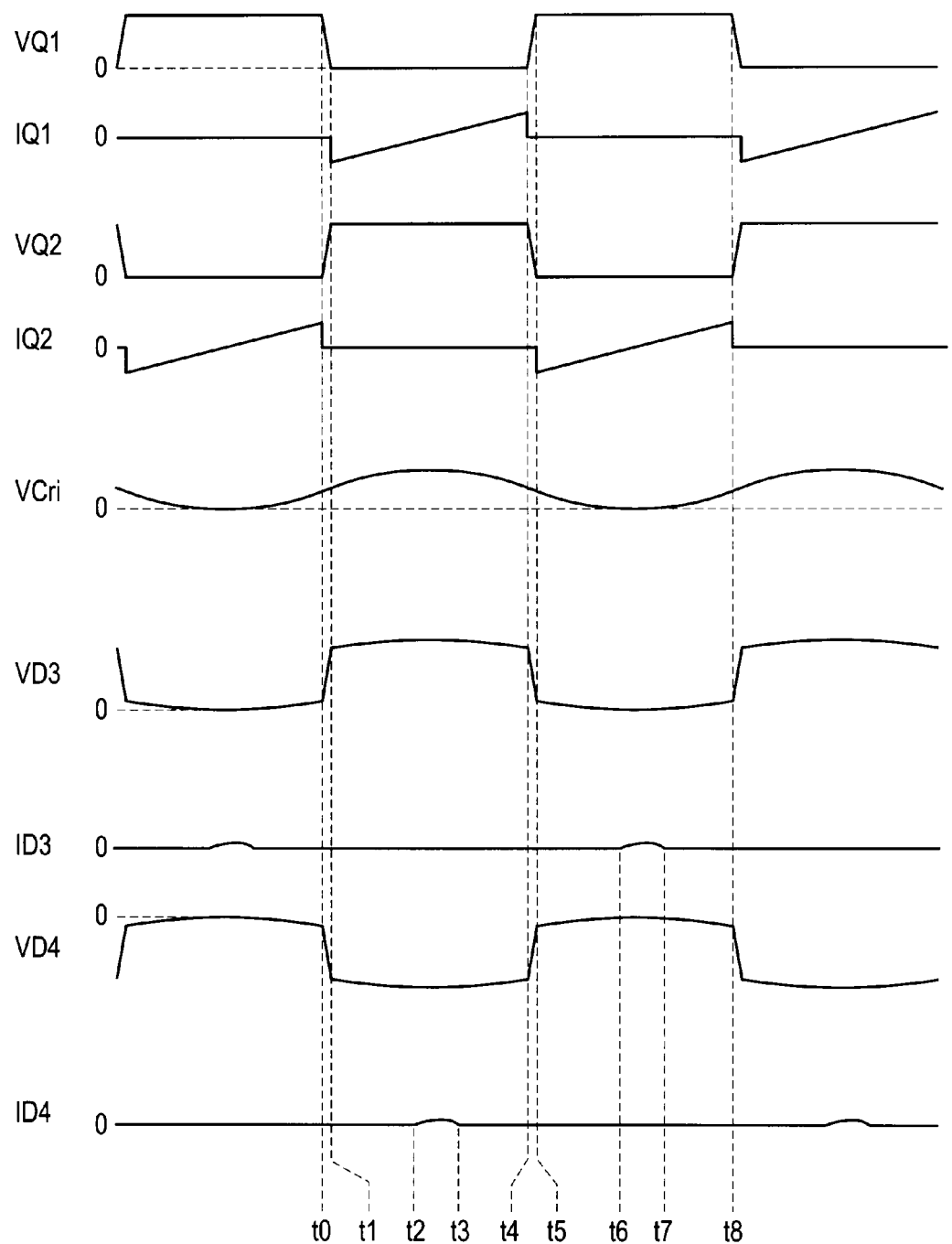
FIG. 9 is a timing chart of signals of each part at no load in the DC converter in Example 1 of the present invention.
Figure 10:
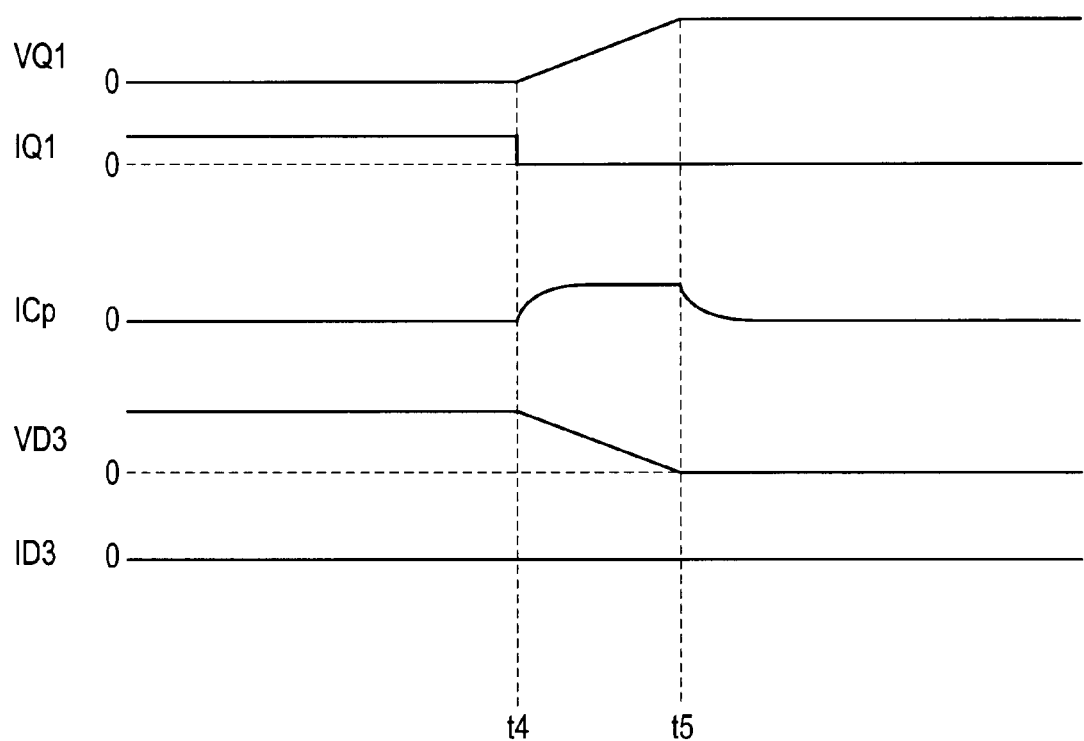
FIG. 10 is a detail of certain interval of the timing chart illustrated in FIG. 9.

FIG. 9 is a timing chart of signals of each part at no load in the DC converter in Example 1 of the present invention. Operation waveforms of the signals in Example 1 illustrated in FIG. 9 are approximately the same as operation waveforms of signals in the conventional circuit illustrated in FIG. 3, and those performances are approximately the same as well. Thus, only different performances are described.

After the switching element Q1 or Q2 is switched from on to off, a voltage between both ends of the switching element Q1 or Q2 is shifted from 0 V to a power supply voltage Vin or from the power supply voltage Vin to 0 V by a voltage resonance. In such a case (e.g. interval from time t0 to t1, and interval from time t4 to t5), the current does not pass through the current resonant reactor Lr, but passes through the capacitor Cr. Thus, the floating capacitance Cp between the primary winding P1 of the transformer T1 is charged and discharged.

When the floating capacitance Cp is not present, a voltage proportional to an inductance value of the current resonant reactor Lr and a reactor Lp is applied to the primary winding P1 of the transformer T1. Therefore, the same voltage as the case where the floating capacitance Cp is not present may be applied to the primary winding P1 of the transformer T1 even when the floating capacitance Cp is present. Thus, a capacitance value of the capacitor Cr can be obtained from an inductance value of the reactor Lp, an inductance value of the current resonant reactor Lr, and a capacitance value of the floating capacitance Cp.

Namely, the capacitor Cr may be configured so that a ratio of an impedance between both ends of the current resonant reactor Lr and an impedance between both ends of the reactor Lp is equal to a ratio of the inductances of the current resonant reactor Lr and the reactor Lp. Therefore, the capacitor Cr is configured to have the following condition, $$Cr = \frac{Lp}{Lr} \cdot Cp. \quad \text{[Math 2]}$$

Accordingly, the capacitor Cr is connected to the current resonant reactor Lr in parallel. Therefore, when dV/dt of the switching elements Q1 and Q2 are changed, the current does not pass through the current resonant reactor Lr, but passes through the capacitor Cr. Then, the floating capacitance Cp between the primary winding P1 of the transformer T1 is charged and discharged. As a result, energy for charging and discharging the parasitic capacitances of the diodes D3 and D4 is not stored in the current resonant reactor Lr, and therefore, the energy is not transmitted to the secondary side of the transformer T1. Thus, it is possible to provide the low-noise, small, inexpensive and, high-efficiency DC converter capable of preventing the frequency at no load from increasing, and achieving a downsized transformer.

Example 2

Figure 11:
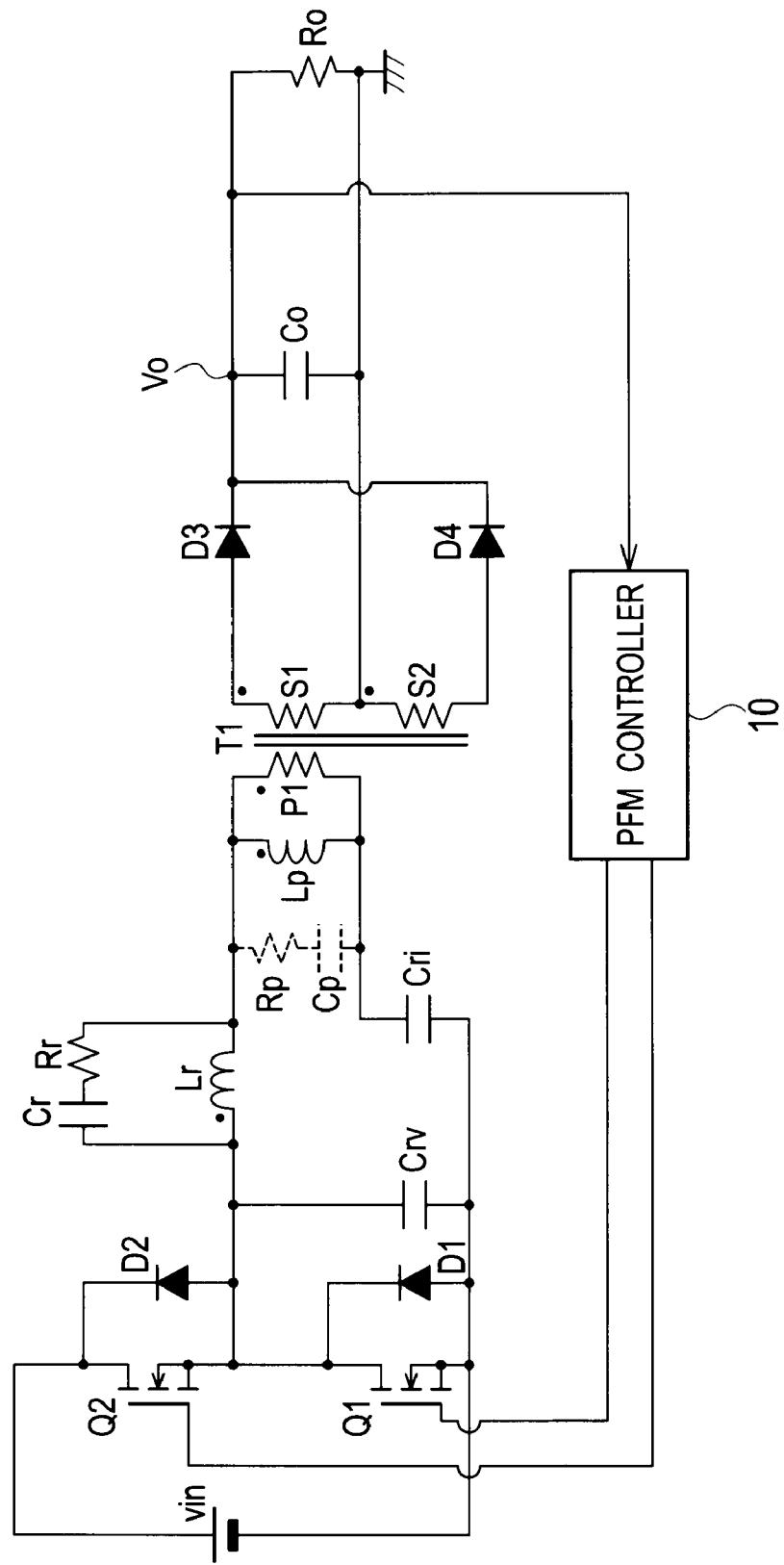
FIG. 11 is a circuit configuration diagram of a DC converter in Example 2 of the present invention.

FIG. 11 is a circuit configuration diagram of a DC converter in Example 2 of the present invention. The floating capacitance Cp between the primary winding P1 of the transformer T1 includes a resistance component in series. Therefore, Example 2 can be represented by an equivalent circuit, which is composed of a series circuit of the floating capacitance Cp and a resistance Rp as illustrated in FIG. 11.

Thus, as illustrated in FIG. 11, the circuit configuration, in which a series circuit of the capacitor Cr and a resistor Rr is connected to the current resonant reactor Lr in parallel while corresponding to the series circuit of the floating capacitance Cp and the resistance Rp, is appropriate as the actual circuit configuration.

In Example 2 illustrated in FIG. 11, similar to Example 1, an influence of the reactor Lp can be cancelled by setting the capacitor Cr and the resistor Rr to meet the following formulae, $$Cr = \frac{Lp}{Lr} \cdot Cp, \quad \text{[Math 3]}$$
$$Rr = \frac{Lr}{Lp} \cdot Rp.$$

That means the value of the capacitor Cr and the resistor Rr may be configured so that a ratio of an impedance of the capacitor Cr and the resistor Rr and an impedance of the floating capacitance Cp between the primary winding P1 of the transformer T1 and the resistor Rp is equal to a ratio of the reactor Lp and the current resonant reactor Lr.

The floating capacitance Cp is mostly the parasitic capacitances of D3 and D4. Magnitude of the parasitic capacitance of the diode varies according to applied voltage. Therefore, a value of the capacitor Cr may be configured to be a capacitance capable of charging and discharging a charge amount of charge and discharge of parasitic capacitances Cd1 and Cd2 of the diodes D3 and D4. When the charge amount of charge and discharge of the parasitic capacitances Cd1 and Cd2 is to be Q, the capacitor Cr is set based on an averaged capacitance within the applied voltages.

Example 3

Figure 12:
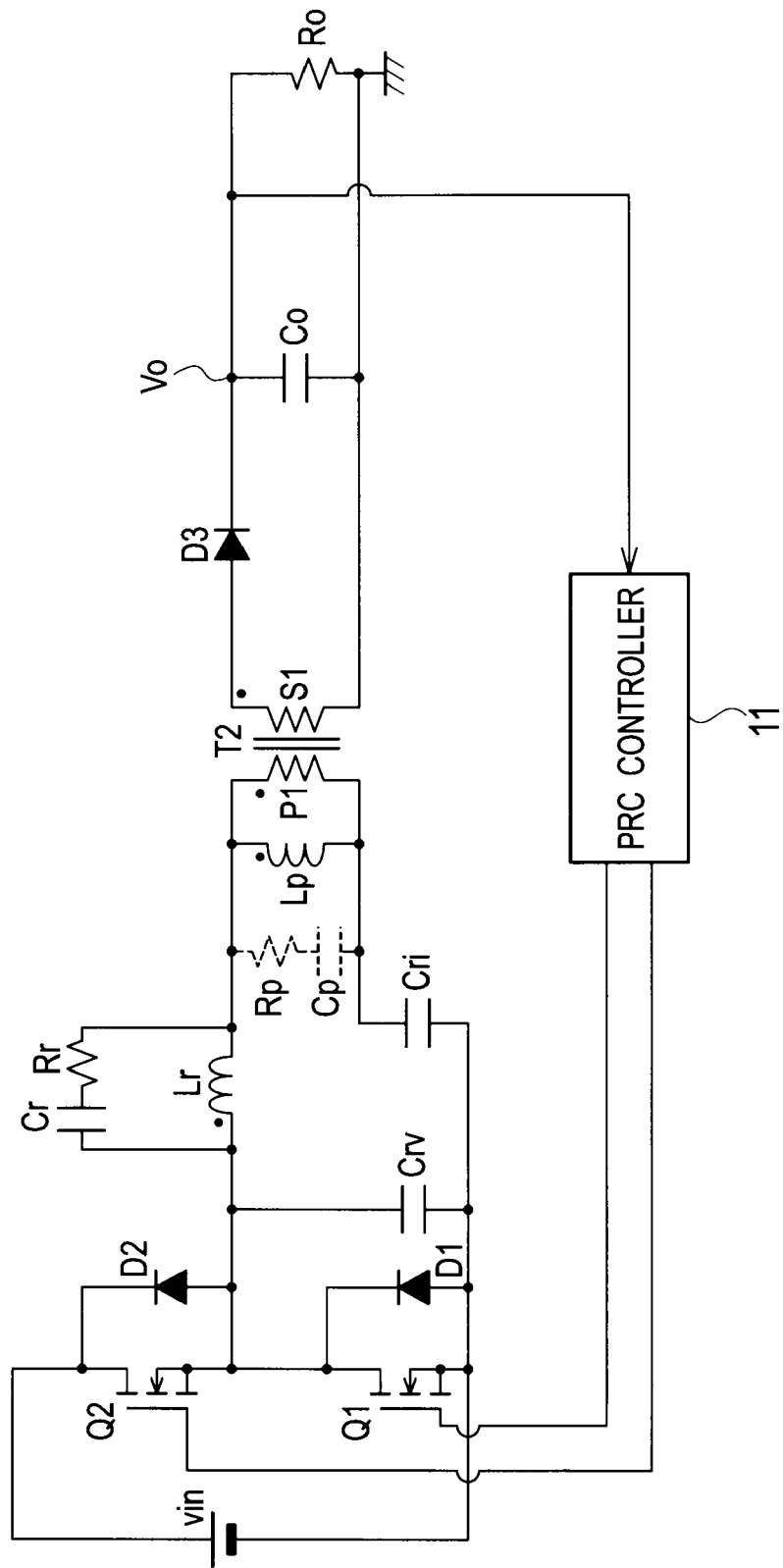
FIG. 12 is a circuit configuration diagram of a DC converter in Example 3 of the present invention.

FIG. 12 is a circuit configuration diagram of a DC converter in Example 3 of the present invention. In Example 3 illustrated in FIG. 12, compared to Example 2 illustrated in FIG. 11, a transformer T2 including the primary winding P1 and the secondary winding S1 is provided while removing the secondary winding S2 and the diode D4, and a PRC controller 11 is employed.

The PRC controller 11 fixes an on-time of one switching element Q1 (or Q2), and varies an ontime of the other switching element Q2 (or Q1). Thus, a DC output voltage Vo is controlled. Note that, both of the switching elements Q1 and Q2 have a dead time that is in an off state of both of the switching elements Q1 and Q2 simultaneously.

According to such a configuration, when the switching element Q2 is an on state, a current passes through the capacitor Co via the diode D3 from the secondary winding S1 of the transformer T2. Accordingly, power is applied to a load Ro. While, when the switching element Q1 is an on state, the diode D3 turns off. Thus, a half-wave rectifier output is applied to the load Ro. Other operations are completely the same as that in Example 1, and the same effect as Example 1 can be achieved.

Example 4

Figure 13:
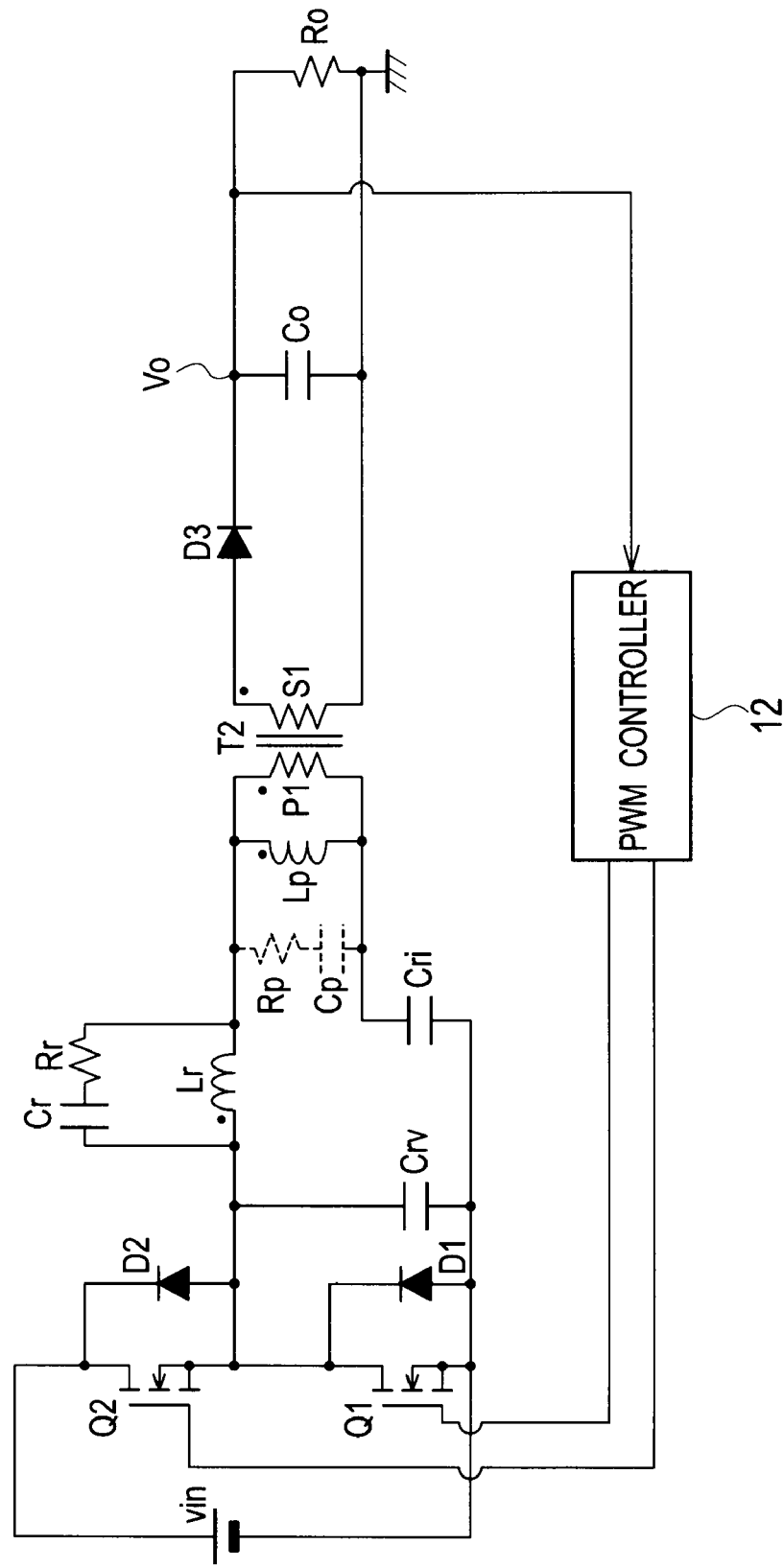
FIG. 13 is a circuit configuration diagram of a DC converter in Example 4 of the present invention.

FIG. 13 is a circuit configuration diagram of a DC converter in Example 4 of the present invention. In Example 4 illustrated in FIG. 13, compared to Example 3 illustrated in FIG. 12, a PWM controller 12 is employed instead of the PRC controller 11.

The PWM controller 12 fixes frequency of the switching elements Q1 and Q2, and varies on-duty of the switching elements Q1 and Q2. Thus, the DC output voltage Vo is controlled. Note that, both of the switching elements Q1 and Q2 have a dead time that is in an off state of both of the switching elements Q1 and Q2 simultaneously.

According to such a configuration in Example 4, operations are also completely the same as that in Example 1, and the same effect as Example 1 can be achieved.

Example 5

Figure 14:
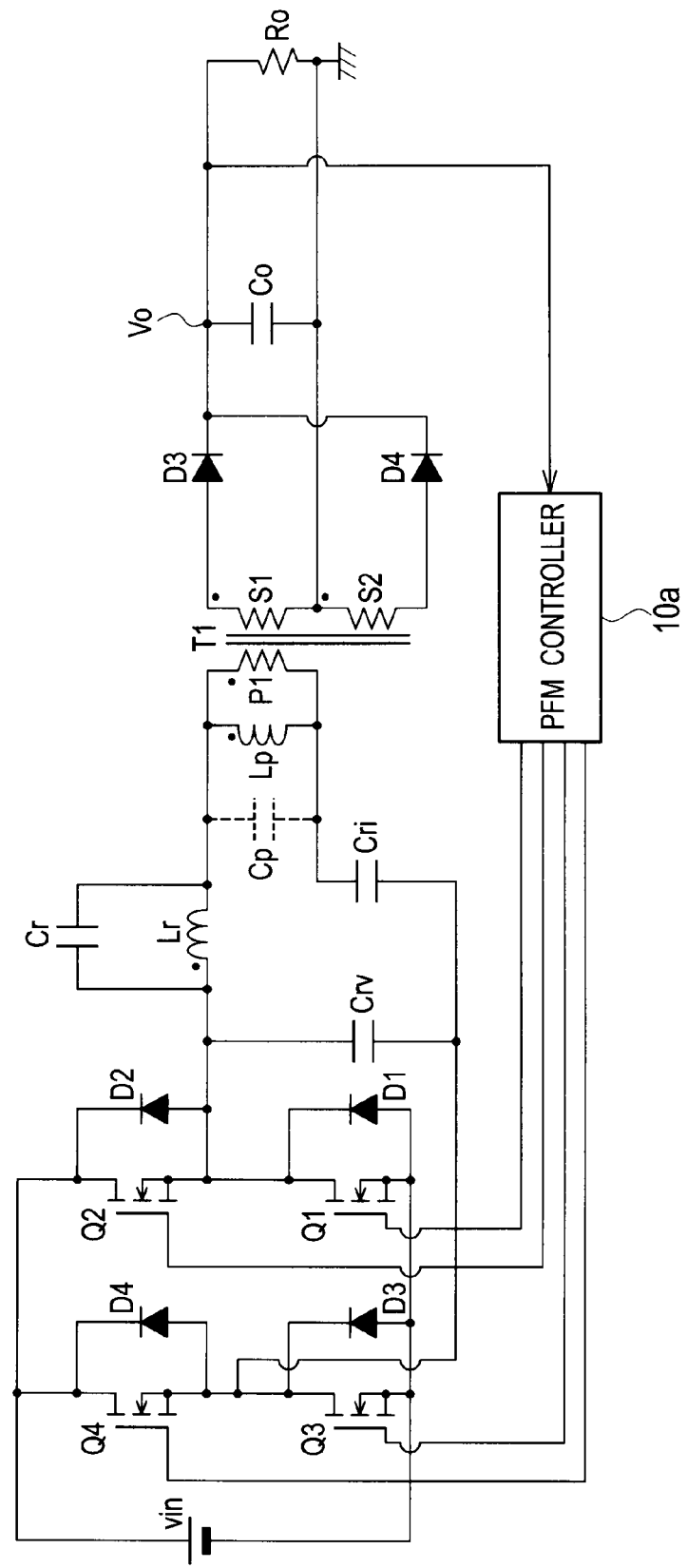
FIG. 14 is a circuit configuration diagram of a DC converter in Example 5 of the present invention.

FIG. 14 is a circuit configuration diagram of a DC converter in Example 5 of the present invention. In Example 5 illustrated in FIG. 14, compared to Example 1 illustrated in FIG. 8, switching elements Q3 and Q4 are added, and a PFM controller 10a is employed. Note that, diodes D1 to D4 may be parasitic capacitances of the switching elements Q1 to Q4.

Both terminals of the DC power supply Vin are additionally connected to a series circuit of the switching elements Q3 and Q4 composed of a MOSFET, compared to the configuration in Example 1. In this case, a drain of the switching element Q4 is connected to a positive electrode of the DC power supply Vin. Also, a source of the switching element Q3 is connected to a negative electrode of the DC power supply Vin.

One end of the current resonant capacitor Cri and one end of the voltage resonant capacitor Cry are connected to a node of the switching elements Q3 and Q4.

The PFM controller 10a alternately turns on/off the switching elements Q1 and Q4, and the switching elements Q2 and Q3, so as to carry out a PFM control. Thus, the DC output voltage Vo is controlled.

Note that, each pair of the switching elements Q1 and Q4 and the switching elements Q2 and Q3 has a dead time that is in an off state of both pair of the switching elements simultaneously.

According to such a configuration in Example 5, the operations are also completely the same as that in Example 1, and the same effect as Example 1 can be achieved.

Example 6

Figure 15:
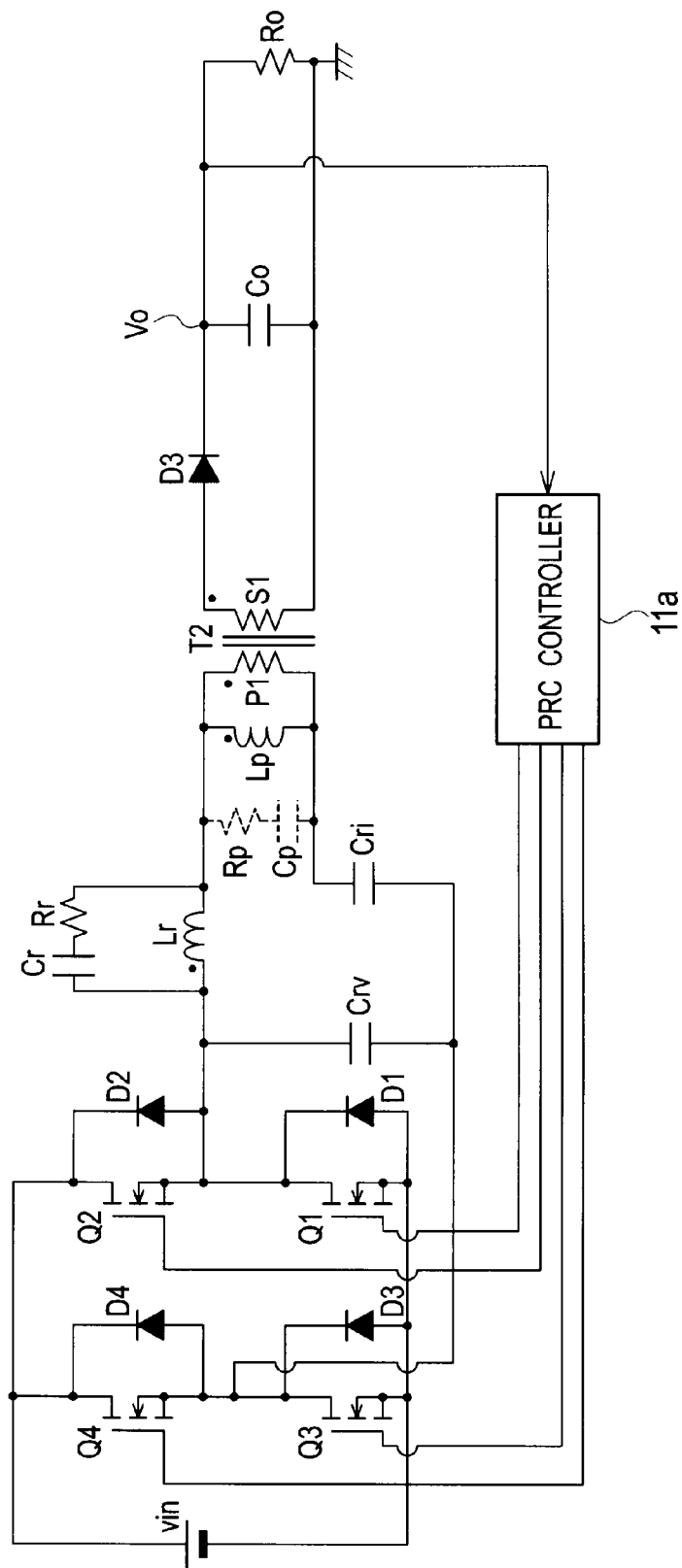
FIG. 15 is a circuit configuration diagram of a DC converter in Example 6 of the present invention.

FIG. 15 is a circuit configuration diagram of a DC converter in Example 6 of the present invention. In Example 6 illustrated in FIG. 15, compared to Example 3 illustrated in FIG. 12, the switching elements Q3 and Q4 are added, and a PRC controller 11a is employed.

Both terminals of the DC power supply Vin are connected to a series circuit of the switching elements Q3 and Q4 composed of a MOSFET. A drain of the switching element Q4 is connected to a positive electrode of the DC power supply Vin. Also, a source of the switching element Q3 is connected to a negative electrode of the DC power supply Vin.

One end of the current resonant capacitor Cri and one end of the voltage resonant capacitor Cry are connected to a node of the switching elements Q3 and Q4.

The PRC controller 11a alternately turns on/off the switching elements Q1 and Q4, and the switching elements Q2 and Q3. In this case, on-time of one pair of the switching elements Q1 and Q4 (or Q2 and Q3) is fixed, and on-time of the other pair of the switching elements Q2 and Q3 (or Q1 and Q4) is varied. Thus, the DC output voltage Vo is controlled.

Note that, each pair of the switching elements Q1 and Q4 and the switching elements Q2 and Q3 has a dead time that is in an off state of both pair of the switching elements simultaneously.

According to such a configuration in Example 6, the operations are also completely the same as that in Example 1, and the same effect as Example 1 can be achieved.

Example 7

Figure 16:
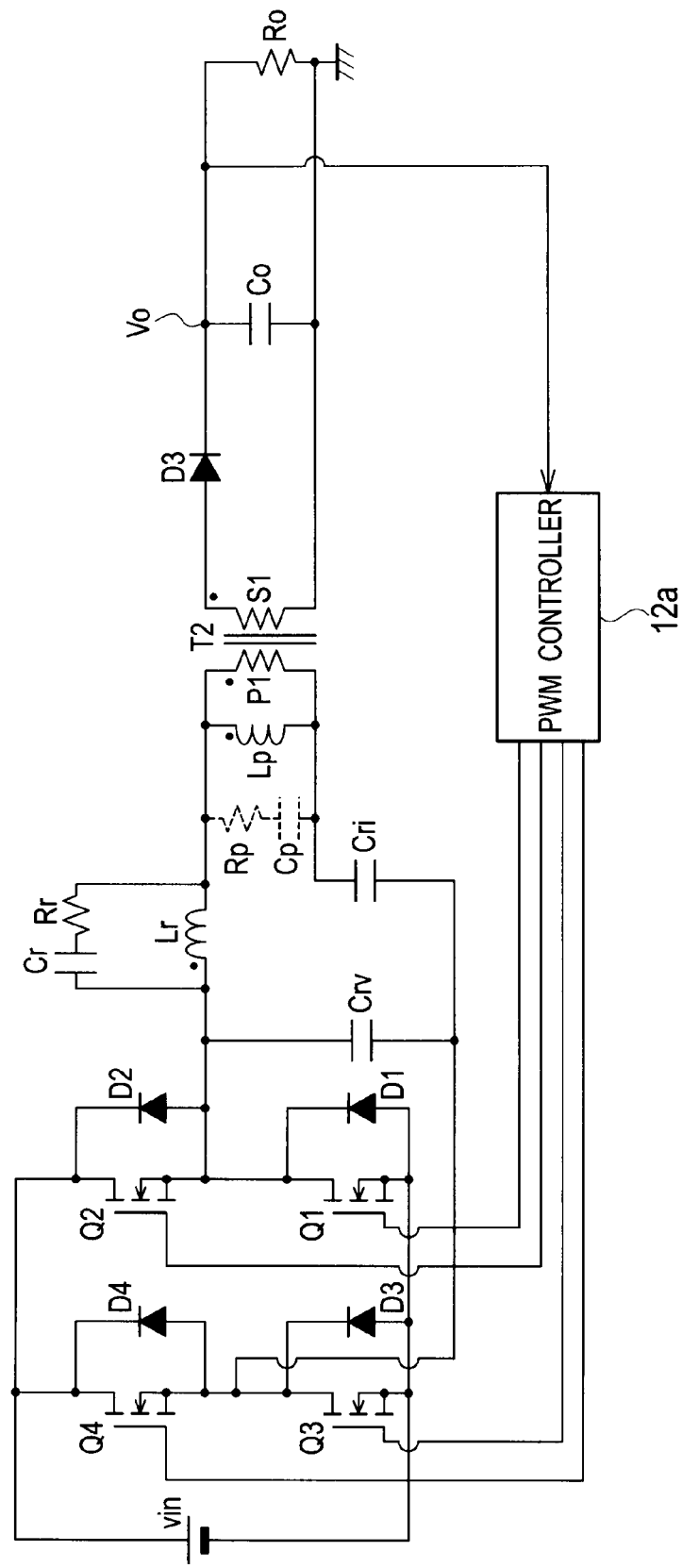
FIG. 16 is a circuit configuration diagram of a DC converter in Example 7 of the present invention.

FIG. 16 is a circuit configuration diagram of a DC converter in Example 7 of the present invention. In Example 7 illustrated in FIG. 16, compared to Example 4 illustrated in FIG. 13, the switching elements Q3 and Q4 are added, and a PWM controller 12a is employed.

Both terminals of the DC power supply Vin are connected to a series circuit of the switching elements Q3 and Q4 composed of a MOSFET. A drain of the switching element Q4 is connected to a positive electrode of the DC power supply Vin. Also, a source of the switching element Q3 is connected to a negative electrode of the DC power supply Vin.

One end of the current resonant capacitor Cri and one end of the voltage resonant capacitor Cry are connected to a node of the switching elements Q3 and Q4.

The PWM controller 12a alternately turns on/off the switching elements Q1 and Q4, and the switching elements Q2 and Q3. In this case, frequencies of the switching elements Q1 to Q4 are fixed, and on-duties of the switching elements Q1 to Q4 are varied. Thus, the DC output voltage Vo is controlled.

Note that, each pair of the switching elements Q1 and Q4 and the switching elements Q2 and Q3 has a dead time that is in an off state of both pair of the switching elements simultaneously.

According to such a configuration in Example 7, the operations are also completely the same as that in Example 1, and the same effect as Example 1 can be achieved.

The invention claimed is:
1. A DC converter, comprising:
a transformer comprising a primary winding and a secondary winding;
a series resonant circuit in which a current resonant reactor, the primary winding of the transformer, and a current resonant capacitor are connected in series;

a conversion circuit for converting a DC voltage of a DC power supply into a rectangular-wave voltage, so as to output the rectangular-wave voltage to the series resonant circuit;

a rectifier smoothing circuit for rectifying and smoothing a voltage generated at the secondary winding of the transformer, so as to output a DC output voltage to a load; and a capacitive element connected to the current resonant reactor in parallel, wherein a capacitance of the capacitive element is set as a value of a floating capacitance equivalently present between the primary winding of the transformer multiplied by a value of a magnetizing inductance of the primary winding of the transformer divided by an inductance value of the current resonant reactor.

2. The DC converter of claim 1, wherein
the conversion circuit comprises:
- a first switching element of which one end is connected to a negative electrode of the DC power supply; and
- a second switching element of which one end is connected to the other end of the first switching element and of which the other end is connected to a positive electrode of the DC power supply, the DC voltage of the DC power supply is converted into a rectangular-wave voltage by alternatively turning on/off the first switching element and the second switching element, and the rectangular-wave voltage is outputted to the series resonant circuit connected between both ends of the first switching element or both ends of the second switching element.

3. The DC converter of claim 1, wherein
the conversion circuit comprises:
- a first switching element of which one end is connected to a negative electrode of the DC power supply;
- a second switching element of which one end is connected to the other end of the first switching element and of which the other end is connected to a positive electrode of the DC power supply,
- a third switching element of which one end is connected to a negative electrode of the DC power supply; and
- a fourth switching element of which one end is connected to the other end of the third switching element and of which the other end is connected to a positive electrode of the DC power supply, the DC voltage of the DC power supply is converted into an AC rectangular-wave voltage by alternatively turning on/off the first switching element and the fourth switching element, and the second switching element and the third switching element, and the AC rectangular-wave voltage is outputted to the series resonant circuit connected between a node of the first switching element and the second switching element and a node of the third switching element and the fourth switching element.

4. The DC converter of claim 2, further comprising:
a controller that controls the DC output voltage by fixing an on-time of one of the switching elements alternatively turned on/off and varying an on-time of the other switching element alternatively turned on/off.

5. The DC converter of claim 3, further comprising:
a controller that controls the DC output voltage by fixing an on-time of the first switching element and the fourth switching element and varying an on-time of the second switching element and the third switching element, or by fixing the on-time of the second switching element and the third switching element and varying the on-time of the first switching element and the fourth switching element.

6. The DC converter of claim 2, further comprising:
a controller that controls the DC output voltage by fixing an on-duty of each of the switching elements and varying a frequency of each of the switching elements.

7. The DC converter of claim 3, further comprising:
a controller that controls the DC output voltage by fixing an on-duty of each of the switching elements and varying a frequency of each of the switching elements.

8. The DC converter of claim 2, further comprising:
a controller that controls the DC output voltage by fixing a frequency of each of the switching elements and varying an on-duty of each of the switching elements.

9. The DC converter of claim 3, further comprising:
a controller that controls the DC output voltage by fixing a frequency of each of the switching elements and varying an on-duty of each of the switching elements.

* * * * *